United States Patent
Sakamoto et al.

(10) Patent No.: US 11,785,475 B2
(45) Date of Patent: Oct. 10, 2023

(54) WIRELESS TERMINAL ACCOMMODATION DETERMINATION APPARATUS, WIRELESS TERMINAL ACCOMMODATION DETERMINATION METHOD AND PROGRAM

(71) Applicant: NIPPON TELEGRAPH AND TELEPHONE CORPORATION, Tokyo (JP)

(72) Inventors: Kazumitsu Sakamoto, Musashino (JP); Kenji Suzuki, Musashino (JP); Yohei Katayama, Musashino (JP); Yosuke Fujino, Musashino (JP); Hiroyuki Fukumoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 198 days.

(21) Appl. No.: 17/435,093

(22) PCT Filed: Mar. 2, 2020

(86) PCT No.: PCT/JP2020/008607
§ 371 (c)(1),
(2) Date: Aug. 31, 2021

(87) PCT Pub. No.: WO2020/184246
PCT Pub. Date: Sep. 17, 2020

(65) Prior Publication Data
US 2022/0132357 A1 Apr. 28, 2022

(30) Foreign Application Priority Data
Mar. 8, 2019 (JP) .................................. 2019-042476

(51) Int. Cl.
*H04B 17/26* (2015.01)
*H04B 17/318* (2015.01)
(Continued)

(52) U.S. Cl.
CPC ............ *H04W 16/18* (2013.01); *H04B 17/26* (2015.01); *H04B 17/318* (2015.01);
(Continued)

(58) Field of Classification Search
CPC ......... H04B 17/0082–409; H04L 41/02–5096; H04L 43/02–55; H04W 16/02–32;
(Continued)

(56) References Cited

U.S. PATENT DOCUMENTS

2010/0188997 A1  7/2010  Aoyama et al.

FOREIGN PATENT DOCUMENTS

JP  5077347 B2  11/2012
JP  201472853 A  4/2014

OTHER PUBLICATIONS

Hisato Iwai, Radio Propagation in Mobile Communications—Fundamental Knowledge for Simulations Analysis of Wireless Communications—Corona Publishing Co., Ltd., Nov. 22, 2012, pp. 16-19.

Primary Examiner — Timothy J Weidner
(74) Attorney, Agent, or Firm — Harness, Dickey & Pierce, P.L.C.

(57) ABSTRACT

A radio terminal accommodation determination device includes: an average received power calculation unit for calculating an average received power for each mesh constituting an area; an interfering signal power CDF creation unit for creating a cumulative distribution function of all interfering signal powers; an intended signal power PDF creation unit for creating a fourth probability density function indicating a probability density function of an intended
(Continued)

signal power; and a communication success rate estimation unit for calculating, for each base station, a communication success rate of the intended terminal based on the cumulative distribution function and the fourth probability density function.

6 Claims, 5 Drawing Sheets

(51) Int. Cl.
| | |
|---|---|
| H04B 17/345 | (2015.01) |
| H04B 17/373 | (2015.01) |
| H04B 17/391 | (2015.01) |
| H04W 16/18 | (2009.01) |
| H04W 16/22 | (2009.01) |
| H04W 24/02 | (2009.01) |
| H04W 24/06 | (2009.01) |
| H04W 24/08 | (2009.01) |
| H04W 28/02 | (2009.01) |
| H04W 28/16 | (2009.01) |
| H04W 64/00 | (2009.01) |
| H04W 84/02 | (2009.01) |
| H04W 88/02 | (2009.01) |
| H04W 88/08 | (2009.01) |
| H04W 88/18 | (2009.01) |
| H04W 92/02 | (2009.01) |
| H04W 92/10 | (2009.01) |
| H04W 92/20 | (2009.01) |

(52) U.S. Cl.
CPC ......... *H04B 17/345* (2015.01); *H04B 17/373* (2015.01); *H04B 17/391* (2015.01); *H04W 16/22* (2013.01); *H04W 24/02* (2013.01); *H04W 24/06* (2013.01); *H04W 24/08* (2013.01); *H04W 28/0236* (2013.01); *H04W 28/0247* (2013.01); *H04W 28/16* (2013.01); *H04W 64/003* (2013.01); *H04W 64/006* (2013.01); *H04W 84/02* (2013.01); *H04W 88/02* (2013.01); *H04W 88/08* (2013.01); *H04W 88/18* (2013.01); *H04W 92/02* (2013.01); *H04W 92/10* (2013.01); *H04W 92/20* (2013.01)

(58) Field of Classification Search
CPC ..... H04W 24/02–10; H04W 28/02–26; H04W 36/0005–385; H04W 52/02–60; H04W 64/003–006; H04W 84/005–188; H04W 92/02–24
See application file for complete search history.

WIRELESS TERMINAL ACCOMMODATION DETERMINATION APPARATUS, WIRELESS TERMINAL ACCOMMODATION DETERMINATION METHOD AND PROGRAM

CROSS-REFERENCE TO RELATED APPLICATIONS

This application is a 371 U.S. National Phase of International Application No. PCT/JP2020/008607 filed on Mar. 2, 2020, which claims priority to Japanese Application No. 2019-042476 filed on Mar. 8, 2019. The entire disclosures of the above applications are incorporated herein by reference.

TECHNICAL FIELD

The present invention relates to a radio terminal accommodation determination device, a radio terminal accommodation determination method, and a program.

BACKGROUND ART

With the development of IoT (Internet of Things) technology, more and more things equipped with various sensors and communication functions (hereinafter referred to as "IoT devices" or "terminals") are connected to networks, and remote data collection and remote control of the IoT devices are increasingly performed year by year. Also, in recent years, LPWAs (Low Power Wide Area networks) are attracting attention as radio communication methods for IoT devices. LPWAs include, for example, radio communication methods such as LoRaWAN and Sigfox, which use unlicensed bands (frequency bands that do not require a radio station license), and LTE-M (Long Term Evolution for Machines) and NB (Narrow Band)-IoT, which use licensed bands (frequency bands that require a radio station license).

IoT devices are often mainly installed and used, fixed in specific locations. Meanwhile, radio wave propagation is highly location-dependent. For this reason, if an IoT device is installed in a blind zone where the received power of a radio wave from the base station is low, communication may not be able to be performed for a long period. It is therefore important to carry out radio design such that sufficient received power can be secured in a location where an IoT device is planned to be installed.

If the number of terminals accommodated by a base station is too large, or if radio interference from interference sources such as a surrounding base station often occurs, there are cases where sufficient communication quality cannot be secured even if a new IoT device is installed. In this case, communication failure will occur frequently. For this reason, it is important to not only evaluate the aforementioned received power in a planned installation location, but also determine, in advance, whether or not a new IoT device can be accommodated, while considering the usage of radio resources of the base station and the occurrence of radio interference in the surrounding area. To performs this determination, a means for estimating a communication success rate is needed.

Conventional techniques for estimating the communication success rate include, for example, the techniques described in PTLs 1 and 2. The technique described in PTL 1 is a technique of measuring the communication success rate by temporarily installing a radio device and actually attempting communication. The technique described in PTL 2 is a technique of estimating throughput in a multi-cell environment constituted by a plurality of base stations, using Monte Carlo simulation.

CITATION LIST

Patent Literature

[PTL 1] Japanese Patent Application Publication No. 2014-72853
[PTL 2] Japanese Patent No. 5077347

Non Patent Literature

[NPL 1] Hisato Iwai, "Radio Wave Propagation in Mobile Communications—Basic Knowledge for Radio Communication Simulation—", Corona Publishing Co., Ltd., p. 16-P. 19, Nov. 22, 2012

SUMMARY OF THE INVENTION

Technical Problem

In the technique described in PTL1, a terminal is temporarily installed in a planned installation location and the communication success rate is measured in a real environment, and therefore there is a problem in that large human costs are required for measurement preparation and measurement work. Particularly in a wide-area radio communication system such as LPWA, the human costs required to measure the communication success rate in a real environment are enormous.

The technique described in PTL2, which estimates throughput by means of Monte Carlo simulation, does not require measurement in a real environment. However, the technique described in PTL 2 repeatedly performs processing to probabilistically generate traffic of a large number of terminals using random numbers a huge number of times (e.g. tens of thousands of times or more), and thus estimates throughput while considering interference with surrounding terminals. For this reason, there is a problem in that a huge amount of calculation time is required.

In addition, in PTL 2, propagation loss between a base station and a terminal is calculated while considering distance attenuation (long-term variation) based on a propagation model and shadowing (short-term variation). However, especially in radio communication systems such as LPWA where terminals are often installed in a fixed manner, it is important to estimate the communication success rate while also considering instantaneous variations due to fading. To accurately estimate the communication success rate while considering the instantaneous variation due to fading, it is necessary to repeatedly perform a huge number of times (e.g., tens of thousands of times or more) of processing to, for example, give an influence of instantaneous variation using a random number and calculate instantaneous values of received power of an intended signal and an interfering signal. Thus, a further enormous amount of calculation time is required.

The present invention has been made in view of the foregoing circumstances, and an object of the present invention is to provide a technique of more rapidly estimating the communication success rate in a location where a new radio terminal is planned to be installed, without performing measurement in a real environment or Monte Carlo simulation.

Means for Solving the Problem

One aspect of the present invention is a radio terminal accommodation determination device including: an average received power calculation unit for calculating an average received power for each fine mesh constituting an area, regarding each of a plurality of base stations; an interfering signal power CDF creation unit for determining terminals belonging to each base station based on the average received power, creating, for each base station, a first probability density function indicating a probability density function of an interfering signal power between base stations by substituting an average received power of an interfering signal from the base station into a probability density function of an instantaneous value of received power, creating a second probability density function indicating a probability density function of an interfering signal power from each terminal by substituting an average received power of an interfering signal from the terminal into the probability density function of the instantaneous value of received power, creating a third probability density function indicating a probability density function of all interfering signal powers by convoluting the first probability density function and the second probability density function, and creating a cumulative distribution function of all interfering signal powers based on the third probability density function; an intended signal power PDF creation unit for creating, for each base station, a fourth probability density function indicating a probability density function of an intended signal power by substituting an average received power of an intended signal from an intended terminal into the probability density function of the instantaneous value of received power; and a communication success rate estimation unit for calculating, for each base station, a communication success rate of the intended terminal based on the cumulative distribution function and the fourth probability density function.

One aspect of the present invention is the above-described radio terminal accommodation determination device, wherein the interfering signal power CDF creation unit creates the cumulative distribution function that is available to all terminals in common, by creating the second probability density function using instantaneous values of received power of signals arriving at each base station from all terminals including the intended terminal.

One aspect of the present invention is the above-described radio terminal accommodation determination device, wherein the average received power calculation unit further calculates an average interfering signal power in inter-base station interference based on a positional relationship between the base stations, and the interfering signal power CDF creation unit creates the first probability density function and the second probability density function based on an instantaneous value of received power that is created while considering an influence of instantaneous variation with respect to the average received power, the number of terminals, a traffic pattern, and the average interfering signal power.

One aspect of the present invention is the above-described radio terminal accommodation determination device, further including an iteration determination unit, wherein the intended signal power PDF creation unit sorts the base stations in descending order of the calculated average received power, increases the number of base stations considered in estimation of the communication success rate in descending order of power at each time of iterative processing, and creates an intended signal power PDF for a base station for which calculation is performed, the communication success rate estimation unit calculates the communication success rate based on the cumulative distribution function, the fourth probability density function of the base station for which calculation is performed, and thermal noise power, and the iteration determination unit ends the iterative processing if the calculated communication success rate is greater than or equal to a first predetermined value, or if an amount of change in a value from the communication success rate calculated during the previous iterative processing is within a second predetermined value.

One aspect of the present invention is a radio terminal accommodation determination method including: an average received power calculation step of calculating an average received power for each fine mesh constituting an area, regarding each of a plurality of base stations; an interfering signal power CDF creation step of determining terminals belonging to each base station based on the average received power, creating, for each base station, a first probability density function indicating a probability density function of an interfering signal power between base stations by substituting an average received power of an interfering signal from the base station into a probability density function of an instantaneous value of received power, creating a second probability density function indicating a probability density function of an interfering signal power from each terminal by substituting an average received power of an interfering signal from the terminal into the probability density function of the instantaneous value of received power, creating a third probability density function indicating a probability density function of all interfering signal powers by convoluting the first probability density function and the second probability density function, and creating a cumulative distribution function of all interfering signal powers based on the third probability density function; an intended signal power PDF creation step of creating, for each base station, a fourth probability density function indicating a probability density function of an intended signal power by substituting an average received power of an intended signal from an intended terminal into the probability density function of the instantaneous value of received power; and a communication success rate estimation step of calculating, for each base station, a communication success rate of the intended terminal based on the cumulative distribution function and the fourth probability density function.

One aspect of the present invention is a program for causing a computer to function as the above-described radio terminal accommodation determination device.

Effects of the Invention

According to the present invention, the communication success rate in a location where a new radio terminal is planned to be installed can be rapidly estimated without performing measurement in a real environment or Monte Carlo simulation.

DESCRIPTION OF EMBODIMENTS

Hereinafter, embodiments of the present invention will be described in detail with reference to the drawings. Note that the following embodiments are described while taking, as an example, a radio communication system that use the LoRaWAN Class A and Class B protocols.

In the following embodiments, uplink communication from a terminal (IoT device) to a base station is performed conforming to the Class A protocol. Downlink communication from a base station to a terminal is performed conforming to the Class A protocol when Ack (Acknowledge) responding to the aforementioned uplink communication is transmitted, and is performed conforming to the Class B protocol when data transferred from an application server (not shown) to the base station is transmitted.

In the following embodiments, if there are a plurality of base stations in the vicinity, a signal transmitted from the terminal is received and decoded by the plurality of base stations. Successfully received signals are sent to a host network server (not shown). Of the signals that are successfully received by the network server, a signal with the highest received power is selected (site diversity). If a base station has a plurality of antennas, a signal transmitted from a terminal is received and decoded with the plurality of antennas. Of the signals that are successfully received by the base station, a signal with the highest received power is selected (antenna diversity).

In the following embodiments, in downlink communication, high communication quality is ensured as a result of the downlink communication being performed by a base station and an antenna selected during the previous uplink communication.

Note that in the following description, a terminal for which the communication success rate is to be estimated is referred to as an "intended terminal", and other terminals are referred to as "interfering terminals". A base station with which the intended terminal communicates is referred to as an "intended base station", and other base stations are referred to as "interfering base stations".

First Embodiment

Figure 1:
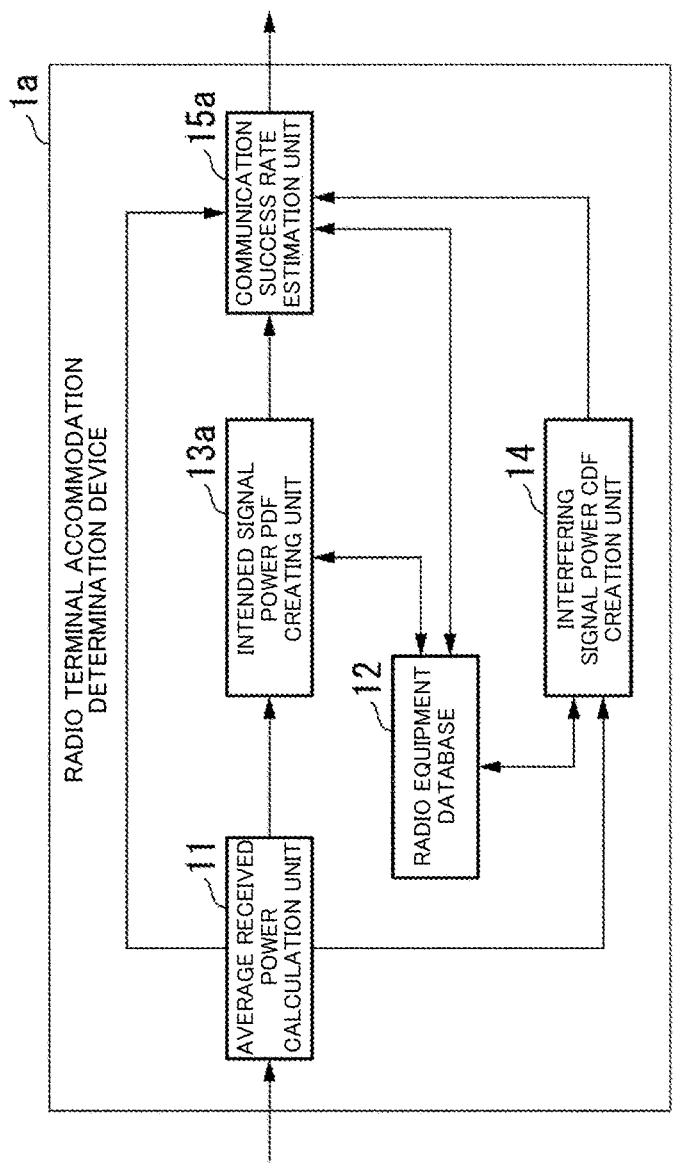
FIG. 1 is a block diagram showing a functional configuration of a radio terminal accommodation determination device 1a according to a first embodiment of the present invention.

The first embodiment of the present invention will be described below.
[Functional Configuration of Radio Terminal Accommodation Determination Device]
FIG. 1 is a block diagram showing a functional configuration of a radio terminal accommodation determination device 1a according to the first embodiment of the present invention. As shown in FIG. 1, the radio terminal accommodation determination device 1a includes an average received power calculation unit 11, a radio equipment database 12, an intended signal power PDF creation unit 13a, an interfering signal power CDF creation unit 14, and a communication success rate estimation unit 15a.

The average received power calculation unit 11 corresponds to a general radio wave propagation simulator. The average received power calculation unit 11 imports map data, e.g. data such as topographical heights, building heights, and land use classifications, from an external device or the like. The average received power calculation unit 11 divides the map data of an area designated by an operator into fine meshes, e.g. meshes with five-meter intervals. Then, the average received power calculation unit 11 calculates an average received power in uplink communication between a base station and each mesh, i.e. an imaginary terminal that is assumed to be installed at a position corresponding to each mesh. The average received power calculation unit 11 also calculates an average interfering signal power in inter-base station interference that occurs between base stations, based on the position of each base station.

Note that all of the following descriptions illustrate the case where the determination is performed for base stations and terminals located in an area designated by the operator.

The radio equipment database 12 holds parameters related to radio equipment, such as the number of antennas and thermal noise power of each base station. The radio equipment database 12 also holds parameters related to radio equipment such as the number of antennas, thermal noise power, and a traffic pattern (communication frequency and communication time per session) of each terminal. Note that if, as in LoRaWAN, there are a plurality of channels and a channel to be used is randomly selected at each time of communication, the communication frequency may be a value obtained by dividing the communication frequency of a terminal by the number of channels.

The intended signal power PDF creation unit 13a creates, for each base station, a probability density function (PDF) of an instantaneous value of received power, considering the influence of instantaneous variation with respect to the average received power between the mesh in which an intended terminal is located and a base station. In the following description, a PDF of the instantaneous value of received power of an intended signal is referred to as an "intended signal power PDF".

The interfering signal power CDF creation unit 14 creates a probability density function (PDF) of an instantaneous value of received power, considering the influence of instantaneous variation and the traffic pattern with respect to an average received power between a mesh in which an interfering terminal is located and a base station. The interfering signal power CDF creation unit 14 also creates a PDF of interfering signal power based on an average received power between an intended base station and an interfering base station and the traffic pattern of interfering terminals under the interfering base stations. The interfering signal power CDF creation unit 14 accumulates created PDFs and creates a CDF. In the following description, a CDF created by accumulating PDFs of interfering signals is referred to as an "interfering signal power CDF".

The communication success rate estimation unit 15a calculates a probability that an intended signal power-to-interference plus noise power ratio (SINR: Signal-to-Interference plus Noise power Ratio) is greater than or equal to a required SINR, based on the intended signal power PDF created by the intended signal power PDF creation unit 13a, the interfering signal power CDF created by the interfering signal power CDF creation unit 14, and thermal noise power of the base stations. Then, the communication success rate estimation unit 15a calculates the communication success rate based on the calculated probability, considering the effects of site diversity and antenna diversity. Here, the required SINR refers to the SINR value required for communication to be successful in the radio communication in a modulation method used.

[Communication Success Rate Estimation]

Processing for estimating the communication success rate will be described below.

Figure 2:
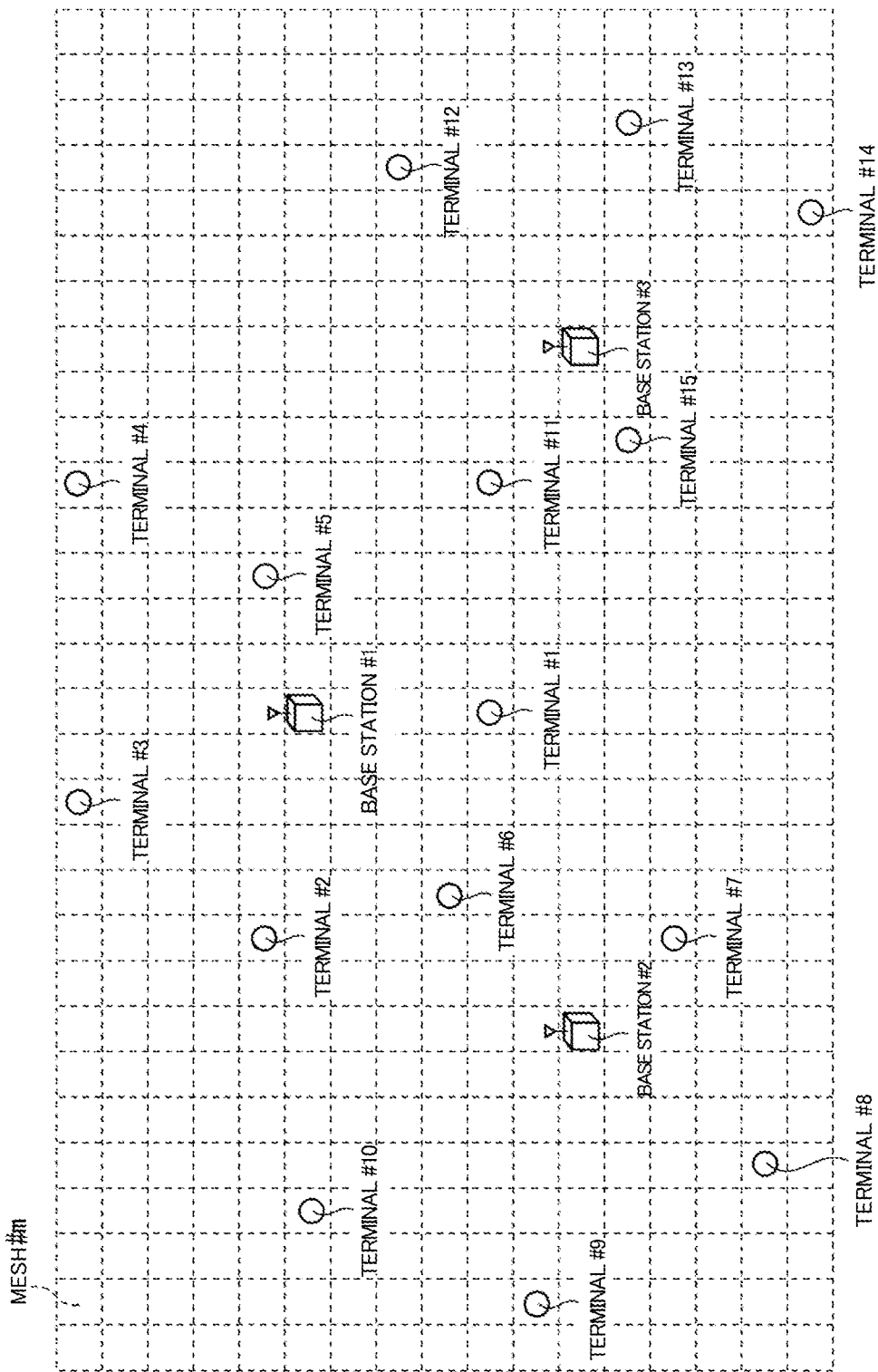
FIG. 2 is a diagram for illustrating communication success rate estimation processing performed by the radio terminal accommodation determination device 1a according to the first embodiment of the present invention.

FIG. 2 is a diagram for illustrating communication success rate estimation processing performed by the radio terminal accommodation determination device 1a according to the first embodiment of the present invention. Note that the following description is given of the case of estimating a communication success rate in a channel that is used only in Class A communication, of a plurality of channels of LoRaWAN. Note that in the case of estimating the communication success rate in a channel used in Class A and Class B communication, the time during which Class B communication occurs may also be considered when a PDF of the interfering signal power from an interfering base station is created by the interfering signal power CDF creation unit 14.

A description will be given below of the case of estimating communication success rates of a terminal #1 and a terminal #6 when the terminal #1 and the terminal #6 are newly installed in an environment in which a radio area is planarly established with three base stations, as shown in FIG. 2. Each base station has one antenna. An average received power at a base station #i (i=1, 2, 3) in uplink communication from a terminal #j (j=1, 2, . . . , 15) is denoted as $R_{up}(i, j)$.

As mentioned above, the average received power calculation unit 11 corresponds to a general radio wave propagation simulator. The average received power calculation unit 11 divides an area designated by the operator into fine meshes. The average received power calculation unit 11 then calculates an average received power in uplink communication between a base station and each mesh, i.e. an imaginary terminal that is assumed to be installed at a position corresponding to each mesh. The average received power calculation unit 11 acquires the value of the average received power in the mesh in which the terminal #j is located, and uses the acquired value as the average received power $R_{up}(i, j)$ in uplink communication between the base station #i and the terminal #j. The average received power calculation unit 11 also calculates an average interfering signal power in inter-base station interference that occurs between base stations, based on the position of each base station. An average interfering signal power in inter-base station interference from the base station #i to a base station #k is denoted as $R_{ICI}(i, k)$.

The interfering signal power CDF creation unit 14 first creates a PDF of the interfering signal power from a terminal (second probability density function) and a PDF of an interfering signal power between base stations (first probability density function).

The interfering signal power CDF creation unit 14 creates, for each terminal, a PDF of an instantaneous value of received power, considering the influence of instantaneous variation and the traffic pattern with respect to the average received power between an intended base station of an intended terminal and the terminal, and obtains a PDF of the interfering signal power from the terminal (a PDF of interfering signals from all the terminals under the intended base station of the intended terminal) by convoluting a plurality of PDFs created.

Note that a Monte Carlo simulation method is a simple method for calculating an instantaneous value of received power. In the Monte Carlo simulation method, an instantaneous value of received power is calculated by randomly determining, using random numbers, phases of a radio wave arriving at the base station #i through a plurality paths and combining the determined phases. By repeating this, a PDF of the instantaneous value of received power can be created. However, this iterative calculation is usually performed a huge number of times (about tens of thousands of times). For this reason, there is a problem in that an enormous amount of calculation time is required.

In the present embodiment, instantaneous variation due to fading is expressed by the following analysis formula. Thus, in the present embodiment, an intended signal power PDF is obtained without performing Monte Carlo simulation.

When the amplitude of a reception signal is denoted as a, the PDF of the amplitude a that instantaneously varies due to Rayleigh fading can be expressed by the following formula (1) using $R_{up}(i, j)$ (see NPL 1).

$$p(a) = \frac{a}{R_{up}(i, j)} \exp\left(-\frac{a^2}{2R_{up}(i, j)}\right) \quad (1)$$

By converting this to a PDF for the power $r=a^2$, the PDF of the instantaneous value of received power can be expressed by the following formula (2).

$$p(r) = p(a)\frac{da}{dr} = \frac{1}{2R_{up}(i, j)} \exp\left(-\frac{r}{2R_{up}(i, j)}\right) \quad (2)$$

Meanwhile, to create a PDF of an interfering signal power between base stations, it is necessary to determine the base station to which each terminal belongs, i.e. the base station from which downlink communication to each terminal is transmitted, and count the number of terminals that belongs to each base station. Here, the number of terminals is counted while assuming that each terminal belongs to the base station #i with which $R_{up}(i, j)$ is largest. Then, a communication occurrence time for Ack (downlink communication conforming to Class A) to the terminals is calculated for each base station based on the traffic pattern in uplink communication of the terminals that belongs to the base station, and a PDF is created while assuming that inter-base station interference with the interference power $R_{ICI}(i, k)$ occurs during the calculated communication occurrence time, of the overall time.

Note that base stations are often installed at high locations such as on the rooftop of a high-rise building in general, and are usually in an environment in which no reflecting object or shielding object is present therearound and lines of sight exist therebetween. For this reason, for inter-base station interference, the average interfering signal power calculated based on the positional relationship between base stations is used. However, in the case where low-power reflected waves arrive in addition to direct waves arriving in line-of-sight paths between base stations, a PDF of an instantaneous value of interfering signal power between the base stations may be created by assuming Rician fading and considering the influence of instantaneous variation due to the Rician fading with respect to the average interfering signal power calculated based on the positional relationship between the base stations.

Then, when creating an interfering signal power CDF in the case where the base station #1 is the intended base station, the interfering signal power CDF creation unit 14 convolutes two PDFs of interfering signal power from an interfering base station #2 and an interfering base station #3 to the base station #1 with a PDF of an interfering signal power from a terminal to the base station #1. Thus, the interfering signal power CDF creation unit 14 creates a PDF of all interfering signal power (which is defined as $PDF_I(r)$) (third probability density function), and creates an interfering signal power CDF ($CDF_{I\_1}(y)$) (cumulative distribution function) using the following formula (3).

$$CDF_{I\_1}(y) = PDF(r \le y) = \int_0^y PDF_I(r)dr \qquad (3)$$

Similarly, when creating an interfering signal power CDF in the case where the base station #2 is the intended base station, the interfering signal power CDF creation unit 14 convolutes two PDFs of interfering signal power from an interfering base station #1 and an interfering base station #3 to the base station #2 with a PDF of an interfering signal power from a terminal to the base station #2. Thus, the interfering signal power CDF creation unit 14 creates a PDF of all interfering signal power (third probability density function), and creates an interfering signal power CDF ($CDF_{I\_2}(y)$) (cumulative distribution function).

Similarly, when creating an interfering signal power CDF in the case where the base station #3 is the intended base station, the interfering signal power CDF creation unit 14 convolutes two PDFs of interfering signal power from an interfering base station #1 and an interfering base station #2 to the base station #3 with a PDF of interfering signal power from a terminal to the base station #3. Thus, the interfering signal power CDF creation unit 14 creates a PDF of all interfering signal power (third probability density function), and creates an interfering signal power CDF ($CDF_{I\_3}(y)$) (cumulative distribution function).

The intended signal power PDF creation unit 13a creates intended signal power PDFs ($PDF_{S\_1}(y)$, $PDF_{S\_2}(y)$, and $PDF_{S\_3}(y)$), considering the influence of instantaneous variation with respect to the average received power $R_{up}(1, 1)$, $R_{up}(2, 1)$, and $R_{up}(3, 1)$ of intended signals from the terminal #1 to the base station #1, the base station #2, and the base station #3.

The communication success rate estimation unit 15a calculates the probability that the SINR is greater than or equal to the required SINR, based on the intended signal power PDF created by the intended signal power PDF creation unit 13a, the interfering signal power CDF created by the interfering signal power CDF creation unit 14 and thermal noise power of the base stations. Here, the probability at the base station #i is denoted as $P_{up}(i)$. Considering the site diversity effect, the communication success rate $P'_{up}$ is calculated by the following formula (4).

$$P = (1 - P_{up}(2))(1 - P_{up}(3)) \qquad (4)$$

After the estimation of the communication success rate of the terminal #1 is completed through the above procedure, subsequently, the communication success rate of the terminal #6 is estimated through the same procedure. Here, the processing performed until the interfering signal power CDF is created for each base station performed by the interfering signal power CDF creation unit 14 is common to all terminals (i.e. the created interfering signal power CDF is available to all terminals in common). Therefore, the estimation of the communication success rate of the terminal #6 can be performed using the same results. That is to say, the intended signal power PDF creation unit 13a need only create a PDF of an intended signal power from the terminal #6 to each base station, the communication success rate estimation unit 15a need only calculate $P_{up}(i)$, and the communication success rate estimation unit 15a need only calculate the uplink communication success rate $P'_{up}$ using the above formula (4).

[Operation of Radio Terminal Accommodation Determination Device]

A description will be given below of an operation of the radio terminal accommodation determination device 1a performed during the communication success rate estimation processing.

Figure 3:
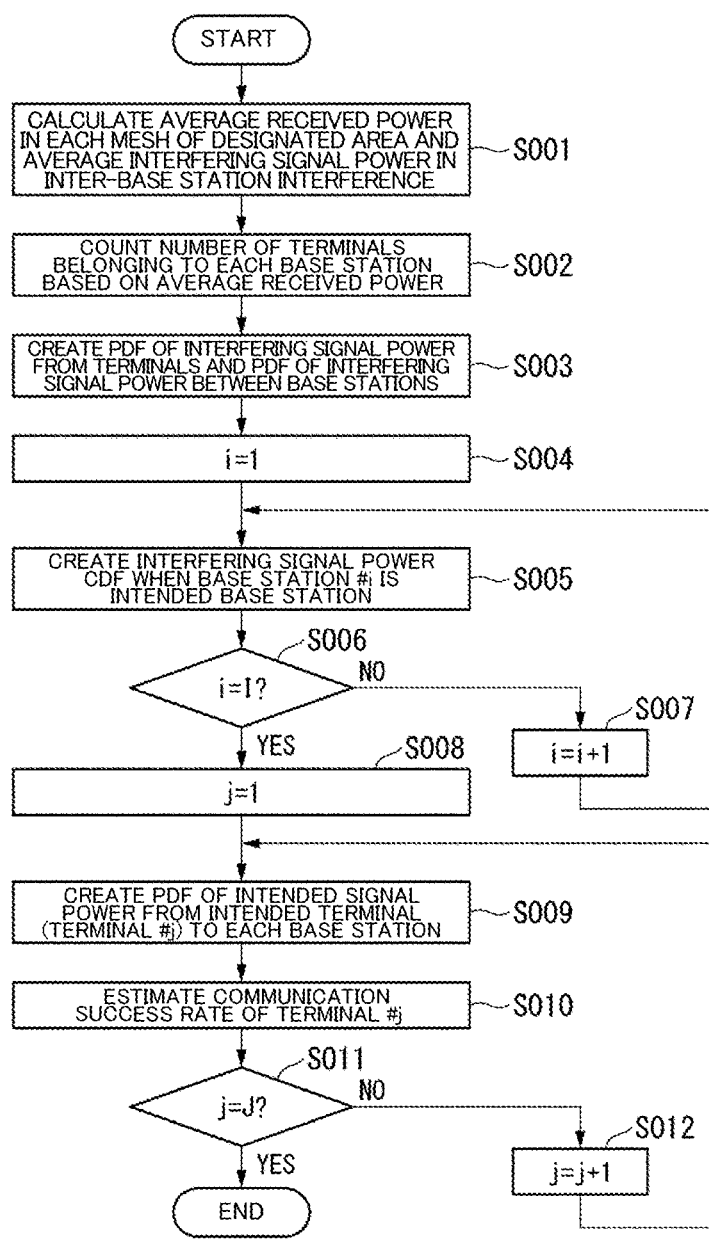
FIG. 3 is a flowchart showing an operation of the radio terminal accommodation determination device 1a according to the first embodiment of the present invention.

FIG. 3 is a flowchart showing an operation of the radio terminal accommodation determination device 1a according to the first embodiment of the present invention. Note that, in the following description, an intended terminal (a terminal for which the communication success rate is to be estimated) is denoted as a terminal #j, and the number of intended terminals is denoted as J.

The average received power calculation unit 11 divides an area designated by the operator into fine meshes. The average received power calculation unit 11 calculates the average received power in uplink communication from each of the divided meshes to each base station. The average received power calculation unit 11 also calculates an average interfering signal power in inter-base station interference based on the position of each base station (step S001).

The interfering signal power CDF creation unit 14 assumes that each terminal belongs to the base station with the largest average received power, and counts the number of terminals belonging to each base station (step S002).

Next, the interfering signal power CDF creation unit 14 creates, for each base station, a PDF of interfering signal power between base stations, based on the traffic pattern in uplink communication of the terminals belonging to the base station. The interfering signal power CDF creation unit 14 also creates a PDF of an instantaneous value of received power for each terminal, considering the influence of instantaneous variation and the traffic pattern with respect to the average received power between the base stations and the terminals. Then, the interfering signal power CDF creation unit 14 creates, for each base station, a PDF of interfering signal power from the terminals by convoluting the created PDFs (step S003).

A value of 1 is substituted for a variable i for identifying the base station (step S004).

The interfering signal power CDF creation unit 14 creates a PDF of all interfering signal power by convoluting the PDF of inter-base station interfering signal power from an interfering base station to an intended base station when the base station #i is the intended base station with the PDF of interfering signal power from the terminals to the intended base station, and creates an interfering signal power CDF (step S005).

Whether or not the variable i is equal to the number of base stations I is determined (step S006). If the variable i is not equal to the number of base stations I (step S006—No), a value of 1 is added to the variable i (step S007), and the flow proceeds to step S005. On the other hand, if the variable i is equal to the number of base stations I (step S006—Yes), the flow proceeds to step S008.

A value of 1 is substituted for a variable j for identifying the intended terminal (step S008).

The intended signal power PDF creation unit 13a creates an intended signal power PDF for each base station, considering the influence of instantaneous variation with respect to the average received power of an intended signal from the terminal #j to each base station (step S009).

The communication success rate estimation unit 15*a* calculates, for each base station, the probability that the SINR is greater than or equal to the required SINR, based on the intended signal power PDF, the interfering signal power CDF, and thermal noise power of the base stations. The communication success rate estimation unit 15*a* then calculates the uplink communication success rate using the above formula (4), based on the calculated probability (step S010).

Whether or not the variable j is equal to the number of intended terminals J is determined (step S011). If the variable j is not equal to the number of intended terminals J (step S011—No), a value of 1 is added to the variable j (step S012), and the flow proceeds to step S005. On the other hand, if the variable j is equal to the number of intended terminals J (step S011—Yes), the processing of the flowchart shown in FIG. 3 ends.

Note that the above description has been given based on the premise that there are a plurality of channels used in Class A communication, and Ack transmission (downlink communication conforming to Class A) responding to uplink communication conforming to Class A from terminals is performed over any of the plurality of channels. However, if a channel for Ack transmission is prepared, and uplink communication and downlink communication conforming to Class A do not interfere with each other, a PDF of interfering signal power between base stations need not be prepared when creating the interfering signal power CDF, and only a PDF of interfering signal power from terminals may be used.

As described above, the radio terminal accommodation determination device 1*a* according to the first embodiment of the present invention includes the average received power calculation unit 11, the interfering signal power CDF creation unit 14, the intended signal power PDF creation unit 13*a*, and the communication success rate estimation unit 15*a*. The average received power calculation unit 11 calculates an average received power for each of the meshes constituting an area, regarding each of a plurality of base stations. The interfering signal power CDF creation unit 14 creates the first probability density function, the second probability density function, the third probability density function, and the interfering signal power CDF (cumulative distribution function). The first probability density function is a PDF indicating a probability density function of interfering signal power between base stations that is obtained by determining terminals that belong to each base station based on the average received power, and substituting, for each base station, the average received power of an interfering signal from the base station for a PDF (probability density function) of an instantaneous value of received power. The second probability density function is a PDF indicating a probability density function of interfering signal power from each terminal that is obtained by substituting the average received power of an interfering signal from each terminal for the PDF (probability density function) of the instantaneous value of received power. The third probability density function is a PDF indicating a probability density function of all interfering signal power that is obtained by convoluting the first probability density function and the second probability density function. The interfering signal power CDF (cumulative distribution function) is a CDF indicating a cumulative distribution function of all interfering signal power based on the third probability density function. The intended signal power PDF creation unit 13*a* creates, for each base station, a PDF (fourth probability density function) indicating a probability density function of intended signal power by substituting the average received power of an intended signal from an intended terminal into the PDF (probability density function) of the instantaneous value of received power. The communication success rate estimation unit 15*a* calculates, for each base station, the communication success rate of the intended terminal based on the interfering signal power CDF (cumulative distribution function) and the intended signal power PDF (fourth probability density function).

With the above-described configuration, the radio terminal accommodation determination device 1*a* according to the first embodiment of the present invention can more rapidly estimate the communication success rate in a location where a new radio terminal is planned to be installed, without performing measurement in a real environment or Monte Carlo simulation.

Second Embodiment

The first embodiment has described the case of estimating the communication success rate, considering the site diversity effect brought about by all base stations. Meanwhile, the following second embodiment will describe the case of estimating the communication success rate only for base stations that highly contribute to the communication success rate. Note that only differences from the first embodiment will be described in the following description.

[Functional Configuration of Radio Terminal Accommodation Determination Device]

Figure 4:
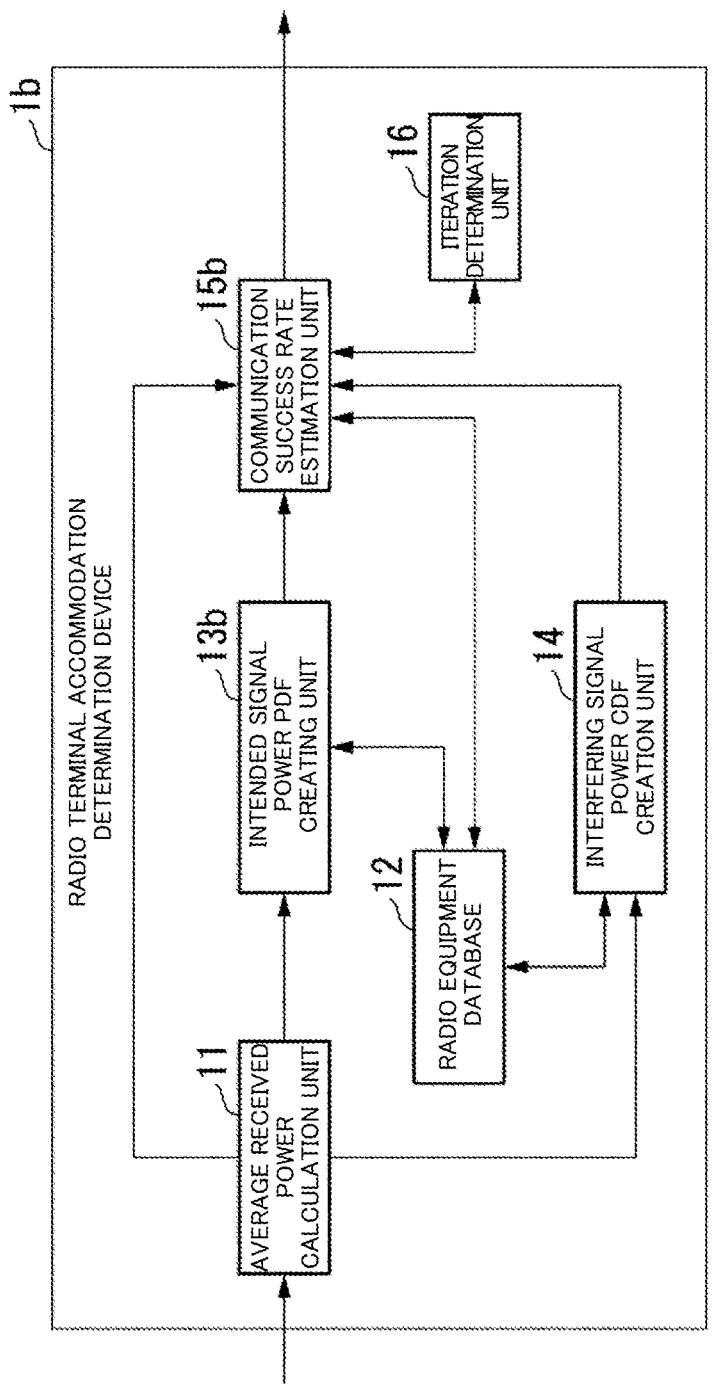
FIG. 4 is a block diagram showing a functional configuration of a radio terminal accommodation determination device 1b according to a second embodiment of the present invention.

FIG. 4 is a block diagram showing a functional configuration of a radio terminal accommodation determination device 1*b* according to the second embodiment of the present invention. As shown in FIG. 4, the radio terminal accommodation determination device 1*b* includes the average received power calculation unit 11, the radio equipment database 12, an intended signal power PDF creation unit 13*b*, the interfering signal power CDF creation unit 14, a communication success rate estimation unit 15*b*, and an iteration determination unit 16. A difference from the functional configuration of the radio terminal accommodation determination device 1*a* according to the first embodiment lies in that the iteration determination unit 16 is provided.

The intended signal power PDF creation unit 13*b* sorts base stations in descending order of the average received power, based on the average received power $R_{up}(i, j)$ calculated by the average received power calculation unit 11. In the later-described iterative processing, the intended signal power PDF creation unit 13*b* determines the number of base stations for which calculation is to be performed for the communication success rate estimation in descending order of the average received power, in accordance with the number of times that the processing has been performed thus far. Then, the intended signal power PDF creation unit 13*b* creates an intended signal power PDF based on $R_{up}(i, j)$ of the base stations for which calculation is performed.

At each time of the iterative processing, the communication success rate estimation unit 15*b* calculates the probability that the SINR is greater than or equal to the required SINR, based on the intended signal power PDF created by the intended signal power PDF creation unit 13*b*, the interfering signal power CDF created by the interfering signal power CDF creation unit 14, and thermal noise power of the base stations. The communication success rate estimation unit 15*b* then calculates the communication success rate, considering the effects of site diversity and antenna diversity, based on the calculated probability. The communication success rate estimation unit 15*b* ends the iterative processing if the end of the iterative processing is determined by the iteration determination unit 16, and outputs the communication success rate calculated at this point as the result.

The iteration determination unit 16 determines the end of the iterative processing if the calculated communication success rate is greater than or equal to a target value (first predetermined value) in the designing operation, or if the amount of change from the communication success rate calculated during the previous iterative processing is within a predetermined value (second predetermined value).

[Communication Success Rate Estimation]

Processing for estimating the communication success rate will be described below. The description will be given of the case of estimating the communication success rates of the terminal #1 and the terminal #6 when the terminal #1 and the terminal #6 are newly installed, similarly to the first embodiment.

First, in the estimation of the communication success rate of the terminal #1, a target value $P_{target}$ (e.g. 0.9 etc.) of the communication success rate in the designing operation and a convergence target value $\Delta P_{target}$ (e.g. 0.02 etc.) of the change in the communication success rate during the iterative processing are determined by the operator. These values are set to the iteration determination unit 16.

The average received power calculation unit 11 calculates average received power $R_{up}(i, 1)$ in uplink communication from the base station #i to the terminal #1. Note that i is any of 1 to I, and I indicates the number of base stations. The average received power calculation unit 11 also calculates the average interfering signal power in inter-base station interference occurring between base stations, similarly to the first embodiment.

The configurations of the radio equipment database 12 and the interfering signal power CDF creation unit 14 are the same as those of the first embodiment, and description thereof is omitted accordingly.

The intended signal power PDF creation unit 13b sorts the base stations in descending order of $R_{up}(i, 1)$. Note that if each base station has a plurality of antennas, the average received powers of the respective antennas are calculated, and the base stations may be sorted with the highest value of these average received powers as a representative value of the base stations, or the base stations may be sorted using the average value of these average received powers.

A description will be given below of the case where the number of base stations for which the communication success rate is to be calculated is increased one by one at each time of the iterative processing. That is to say, the base stations for which the communication success rate is to be calculated at the n-th time of processing is the top n base stations from the one with the highest average received power.

Note that the number of base stations to be increased at each time of the iterative processing is not limited to one, and two base stations may be increased at each time, or the number of base stations to be increased may be exponential, e.g. one at the first time, two at the second time, and then four at the third time. At the n-th time of the processing, the intended signal power PDF creation unit 13b creates the intended signal power PDF, considering the effect of instantaneous variation with respect to the average received power of intended signals from the terminal #1 to the aforementioned top n base stations, using the same method as that of the above-described first embodiment.

The communication success rate estimation unit 15b calculates the communication success rate $P'_{up}(n)$ at the n-th time of the processing based on the intended signal power PDF created by the intended signal power PDF creation unit 13b, the interfering signal power CDF created by the interfering signal power CDF creation unit 14, and thermal noise power of the base stations, using the same method as that of the above-described first embodiment.

The iteration determination unit 16 determines the end of the iterative processing if the communication success rate $P'(n)$ calculated at the n-th time of the processing satisfies the following formula (5), or if the amount of change from the communication success rate $P'_{up}(n-1)$ calculated at the n−1-th time of the processing satisfies the following formula (6). Then, the communication success rate estimation unit 15b outputs the communication success rate $P'_{up}(n)$ calculated at this time as the result of estimating the communication success rate of the terminal #1 to an external device or the like.

$$P'_{up}(n) \geq P_{target} \tag{5}$$

$$P_{up}(n) - P'_{un}(n-1) \leq \Delta P_{target} \tag{6}$$

If the above conditions are not satisfied, the iteration determination unit 16 determines to continue the iterative processing, and proceeds to the n+1-th time of the processing. That is to say, the number of base stations for which the calculation is performed is increased by one, the intended signal power PDF creation unit 13b creates the intended signal power PDF for the top n+1 base stations, and the communication success rate estimation unit 15b calculates the value of $P'_{up}(n+1)$.

If, as a result of the above, the estimation of the communication success rate of the terminal #1 is completed, subsequently, the communication success rate of the terminal #6 is estimated through the same procedure. Here, the processing performed by the interfering signal power CDF creation unit 14 until the interfering signal power CDF for each base station is created is common to all terminals, similarly to the first embodiment. Therefore, the estimation of the communication success rate of the terminal #6 can be performed using the same results. That is to say, the intended signal power PDF creation unit 13b need only create the intended signal power PDF from the terminal #6 to each base station, and the communication success rate estimation unit 15b need only calculate the uplink communication success rate $P'_{up}(n)$ using the above formula (4).

[Operation of Radio Terminal Accommodation Determination Device] A description will be given below of an operation of the radio terminal accommodation determination device 1b performed during the communication success rate estimation processing.

Figure 5:
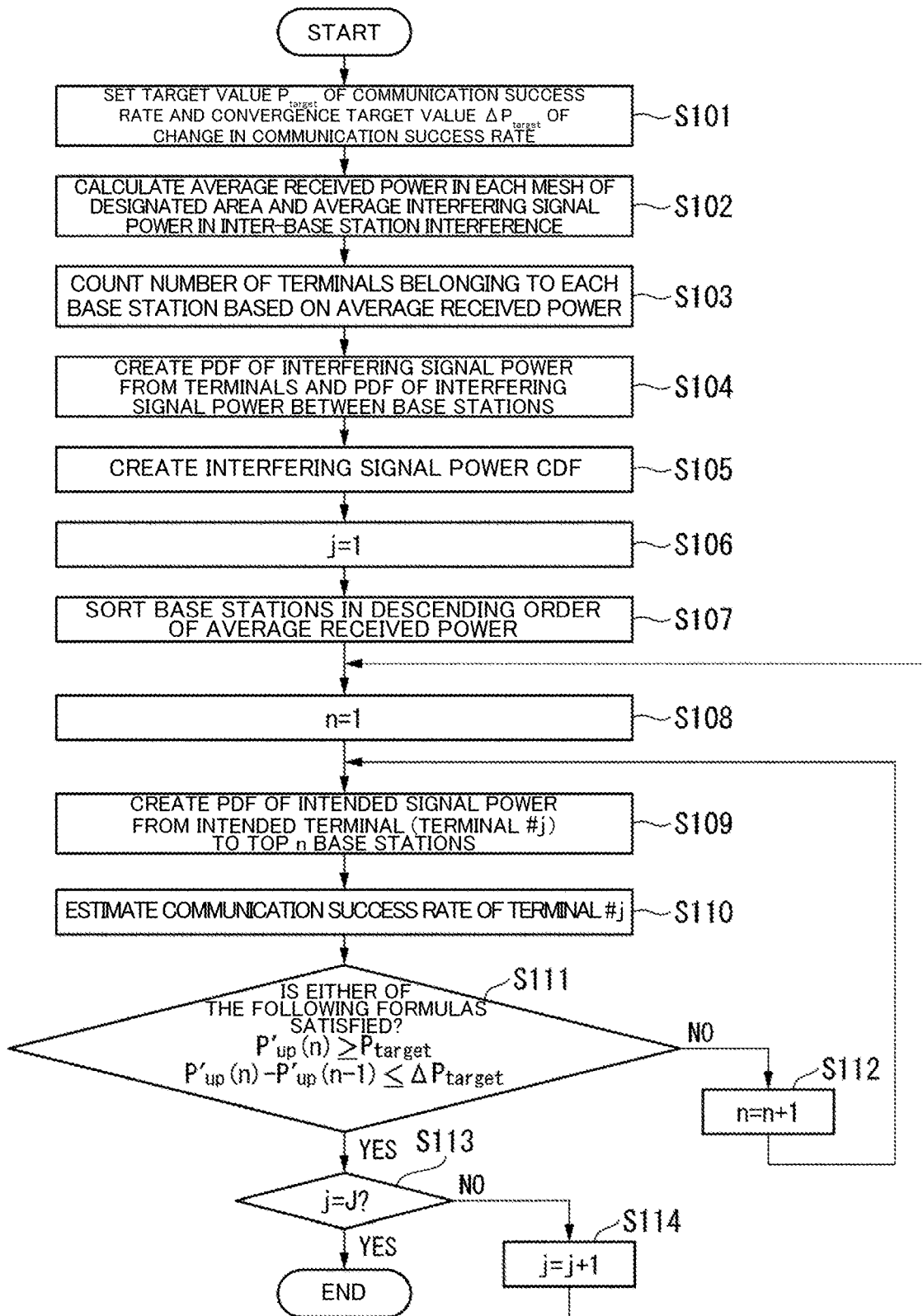
FIG. 5 is a flowchart showing an operation of the radio terminal accommodation determination device 1b according to the second embodiment of the present invention.

FIG. 5 is a flowchart showing an operation of the radio terminal accommodation determination device 1b according to the second embodiment of the present invention.

First, a target value $P_{target}$ of the communication success rate in the designing operation and a convergence target value $\Delta P_{target}$ of the change in the communication success rate in the iterative processing are determined by the operator. The iteration determination unit 16 acquires and sets these determined values (step S101).

The average received power calculation unit 11 divides an area designated by the operator into fine meshes. The average received power calculation unit 11 calculates an average received power in uplink communication from each mesh to each base station. The average received power calculation unit 11 also calculates an average interfering signal power in inter-base station interference based on the positional relationship between the base stations (step S102).

The interfering signal power CDF creation unit 14 assumes that each terminal belongs to the base station with the largest average received power, and counts the number of terminals belonging to each base station (step S103).

Next, the interfering signal power CDF creation unit 14 creates, for each base station, a PDF of interfering signal power between base stations, based on the traffic pattern in uplink communication of the terminals belonging to the base station. The interfering signal power CDF creation unit 14 creates a PDF of an instantaneous value of received power for each terminal, considering the influence of instantaneous variation and the traffic pattern with respect to the average received power between the base stations and the terminals. Then, the interfering signal power CDF creation unit 14 creates, for each base station, a PDF of interfering signal power from the terminals by convoluting the created PDFs (step S104).

The interfering signal power CDF creation unit 14 creates, with each of the base stations as the intended base station in order, a PDF of all interfering signal power by convoluting the PDF of inter-base station interfering signal power from an interfering base station to the intended base station with the PDF of the interfering signal power from the terminals to the intended base station, and creates an interfering signal power CDF, through the same procedure as steps S004 to S007 shown in FIG. 3 (step S105).

A value of 1 is substituted for the variable j for identifying the intended terminal (step S106).

The intended signal power PDF creation unit 13b sorts the base stations in descending order of the average received power (step S107).

A value of 1 is substituted for a variable n for identifying the number of times that the iterative processing has been performed thus far (step S8). The intended signal power PDF creation unit 13b creates an intended signal power PDF for each base station, considering the influence of instantaneous variation with respect to the average received power of the intended signal from the terminal #j to the top n base stations (step S109).

The communication success rate estimation unit 15b calculates, for each base station, the probability that the SINR is greater than or equal to the required SINR, based on the intended signal power PDF, the interfering signal power CDF, and thermal noise power of the base stations. Then, the communication success rate estimation unit 15b calculates the uplink communication success rate using the above formula (4), based on the calculated probability (step S110). The communication success rate estimation unit 15b then determines whether or not at least one of the above formulas (5) and (6) is satisfied (step S111). If neither is satisfied (step S111—No), a value of 1 is added to the variable n (step S112), and the flow proceeds to step S109.

On the other hand, if at least one of the above formulas (5) and (6) is satisfied (step S111—Yes), the communication success rate estimation unit 15b ends the calculation of the communication success rate of the terminal #j, and the flow proceeds to step S113.

Whether or not the variable j is equal to the number of intended terminals J is determined (step S113). If the variable j is not equal to the number of intended terminals J (step S113—No), a value of 1 is added to the variable j (step S14), and the flow proceeds to step S108. On the other hand, if the variable j is equal to the number of intended terminals J (step S113—Yes), the processing of the flowchart shown in FIG. 5 ends.

As described above, the radio terminal accommodation determination device 1b according to the second embodiment calculates the communication success rate only for base stations that highly contribute to the communication success rate (i.e. that have high average received power). Thus, the radio terminal accommodation determination device 1b according to the second embodiment can further shorten the calculation time required to estimate the communication success rate.

A part of or the entire radio terminal accommodation determination device 1a and radio terminal accommodation determination device 1b of the above-described embodiments may be realized by a computer. In this case, these devices may be realized by recording a program for realizing the functions thereof in a computer-readable recording medium, and loading the program recorded in this recording medium to a computer system and executing the loaded program. Note that the "computer system" here includes an OS and hardware such as peripheral devices. The "computer-readable recording medium" refers to a storage device that is any of portable media such as a flexible disk, a magneto-optical disk, a ROM, and a CD-ROM, a hard disk contained in the computer system, or the like. Furthermore, the "computer-readable recording medium" may also include one that dynamically holds the program for a short period, such as a communication line used in the case of transmitting the program via a network such as the Internet or a communication line such as a telephone line, and one that holds the program for a fixed period, such as a volatile memory in a computer system that serves as a server or a client in that case. The aforementioned program may be one for realizing some of the above-described functions, or may be one that can realize the above-described functions by being combined with a program that is already recorded in the computer system, or may be one that is realized using hardware such as a PLD (Programmable Logic Device) or an FPGA (Field Programmable Gate Array).

Although the embodiments of the present invention have been described with reference to the drawings, the above embodiments are merely examples of the present invention, and it is apparent that the present invention is not limited to the above embodiments. Accordingly, constituent elements may be added, omitted, replaced, or modified in any other ways without departing from the technical idea and the gist of the present invention.

REFERENCE SIGNS LIST

1a, 1b Radio terminal accommodation determination device
11 Average received power calculation unit
12 Radio equipment database
13a, 13b Intended signal power PDF creation unit
14 Interfering signal power CDF creation unit
15a, 15b Communication success rate estimation unit
16 Determination unit

The invention claimed is:

1. A radio terminal accommodation determination device comprising:
   a processor; and
   a storage medium having computer program instructions stored thereon, when executed by the processor, perform to:
   calculating an average received power for each mesh constituting an area, regarding each of a plurality of base stations; determining terminals belonging to each base station based on the average received power, creating, for each base station, a first probability density function indicating a probability density function of an interfering signal power between base stations by substituting an average received power of an interfering signal from the base station into a probability density function of an instantaneous value of received power, creating a second probability density function indicating a probability density function of an interfering signal power from each terminal by substituting an average received power of an interfering signal from the terminal into the probability density function of the instantaneous value of received power, creating a third probability density function indicating a probability density function of all interfering signal powers by convoluting the first probability density function and the second probability density function, and creating a cumulative distribution function of all interfering signal powers based on the third probability density function; creating, for each base station, a fourth probability density function indicating a probability density function of an intended signal power by substituting an average received power of an intended signal from an intended terminal into the probability density function of the instantaneous value of received power; and, for each base station, a communication success rate of the intended terminal based on the cumulative distribution function and the fourth probability density function.

2. The radio terminal accommodation determination device according to claim 1, wherein the computer program instructions further perform to creates the cumulative distribution function that is available to all terminals in common, by creating the second probability density function using instantaneous values of received power of signals arriving at each base station from all terminals including the intended terminal.

3. The radio terminal accommodation determination device according to claim 1, wherein the computer program instructions further perform to calculates an average interfering signal power in inter-base station interference based on a positional relationship between the base stations, and creates the first probability density function and the second probability density function based on an instantaneous value of received power that is created while considering an influence of instantaneous variation with respect to the average received power, the number of terminals, a traffic pattern, and the average interfering signal power.

4. The radio terminal accommodation determination device according to claim 1, wherein the computer program instructions further perform to sorts the base stations in descending order of the calculated average received power, increases the number of base stations considered in estimation of the communication success rate in descending order of power at each time of iterative processing, and creates an intended signal power PDF for a base station for which calculation is performed, calculates the communication success rate based on the cumulative distribution function, the fourth probability density function of the base station for which calculation is performed, and thermal noise power, and ends the iterative processing if the calculated communication success rate is greater than or equal to a first predetermined value, or if an amount of change in a value from the communication success rate calculated during the previous iterative processing is within a second predetermined value.

5. A non-transitory computer-readable medium having computer-executable instructions that, upon execution of the instructions by a processor of a computer, cause the computer to function as the radio terminal accommodation determination device according to claim 1.

6. A radio terminal accommodation determination method comprising: an average received power calculation step of calculating an average received power for each mesh constituting an area, regarding each of a plurality of base stations; an interfering signal power CDF creation step of determining terminals belonging to each base station based on the average received power, creating, for each base station, a first probability density function indicating a probability density function of an interfering signal power between base stations by substituting an average received power of an interfering signal from the base station into a probability density function of an instantaneous value of received power, creating a second probability density function indicating a probability density function of an interfering signal power from each terminal by substituting an average received power of an interfering signal from the terminal into the probability density function of the instantaneous value of received power, creating a third probability density function indicating a probability density function of all interfering signal powers by convoluting the first probability density function and the second probability density function, and creating a cumulative distribution function of all interfering signal powers based on the third probability density function; an intended signal power PDF creation step of creating, for each base station, a fourth probability density function indicating a probability density function of an intended signal power by substituting an average received power of an intended signal from an intended terminal into the probability density function of the instantaneous value of received power; and a communication success rate estimation step of calculating, for each base station, a communication success rate of the intended terminal based on the cumulative distribution function and the fourth probability density function.

* * * * *